(12) United States Patent
Donohoe et al.

(10) Patent No.: US 10,656,920 B2
(45) Date of Patent: May 19, 2020

(54) DYNAMICALLY ADAPTABLE TOOL FOR GRAPHICAL DEVELOPMENT OF USER INTERFACES

(71) Applicant: Apple Inc., Cupertino, CA (US)

(72) Inventors: Brendan P. Donohoe, Oakland, CA (US); Kevin B. Cathey, San Jose, CA (US); Anton L. Vladimirov, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/138,920

(22) Filed: Sep. 21, 2018

(65) Prior Publication Data
US 2019/0369969 A1  Dec. 5, 2019

Related U.S. Application Data

(60) Provisional application No. 62/679,889, filed on Jun. 3, 2018.

(51) Int. Cl.
| | |
|---|---|
| *G06F 9/44* | (2018.01) |
| *G06F 8/33* | (2018.01) |
| *G06F 8/38* | (2018.01) |
| *G06F 8/77* | (2018.01) |
| *G06F 8/41* | (2018.01) |
| *G06F 8/34* | (2018.01) |
| *G06F 16/245* | (2019.01) |

(52) U.S. Cl.
CPC ............. *G06F 8/33* (2013.01); *G06F 8/34* (2013.01); *G06F 8/38* (2013.01); *G06F 8/41* (2013.01); *G06F 8/77* (2013.01); *G06F 16/245* (2019.01)

(58) Field of Classification Search
CPC ......... G06Q 30/02; G06F 9/451; G06F 16/23; G06F 8/315; G06F 8/20; G06F 8/33; G06F 8/34
See application file for complete search history.

(56) References Cited

U.S. PATENT DOCUMENTS

| | | | | |
|---|---|---|---|---|
| 6,496,870 B1 * | 12/2002 | Faustini | .................... | G06F 8/20 717/107 |
| 2008/0184139 A1 * | 7/2008 | Stewart | .................. | G06F 9/451 715/762 |

(Continued)

*Primary Examiner* — Tuan A Vu
(74) *Attorney, Agent, or Firm* — Morgan, Lewis & Bockius LLP

(57) ABSTRACT

Implementations of the subject technology provide for receiving code associated with a representation of a user interface (UI) element, wherein the code is included in a project in an integrated development environment (IDE). The subject technology further provides for determining a set of dynamically generated editors for modifying the representation of the UI element based on an analysis of the code at least in part on contextual information related to the UI element, and querying for a set of actions associated with the selection, the set of dynamically generated editors being generated based at least in part on an analysis of the code. In addition, the subject technology displays a tool for graphically modifying the representation of the UI element, the tool including a set of graphical elements corresponding to the determined set of dynamically generated editors, where the graphically modifying transforms code associated with the representation of the UI element.

20 Claims, 13 Drawing Sheets

(56) References Cited

U.S. PATENT DOCUMENTS

2011/0083119 A1* 4/2011 Emmelmann ........... G06F 8/315
717/111
2014/0195901 A1* 7/2014 DeBlois ................. G06Q 30/02
715/256
2018/0032626 A1* 2/2018 Ben-Aharon ........... G06F 16/23

* cited by examiner

DYNAMICALLY ADAPTABLE TOOL FOR GRAPHICAL DEVELOPMENT OF USER INTERFACES

CROSS-REFERENCE TO RELATED APPLICATIONS

The present application claims the benefit of U.S. Provisional Patent Application Ser. No. 62/679,889, entitled "DYNAMICALLY ADAPTABLE TOOL FOR GRAPHICAL DEVELOPMENT OF USER INTERFACES," filed Jun. 3, 2018, which is hereby incorporated herein by reference in its entirety and made part of the present U.S. Utility Patent Application for all purposes.

TECHNICAL FIELD

The present description relates generally to designing and developing user interfaces, including graphical development of user interfaces and user interface elements.

BACKGROUND

A given operating system may provide graphics and imaging frameworks for developers to create "views" for graphical user interfaces (GUIs or UIs) of a computer application. User Interfaces (UIs) for software applications have increased in complexity and may be implemented to handle one or more views, animations, videos, windows, frames, events, etc., among other types of graphical-related functionality. With the increased complexity, developers may need tools that enable developing/designing UIs in a manner that avoids introducing bugs that can be difficult to debug and resolve.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
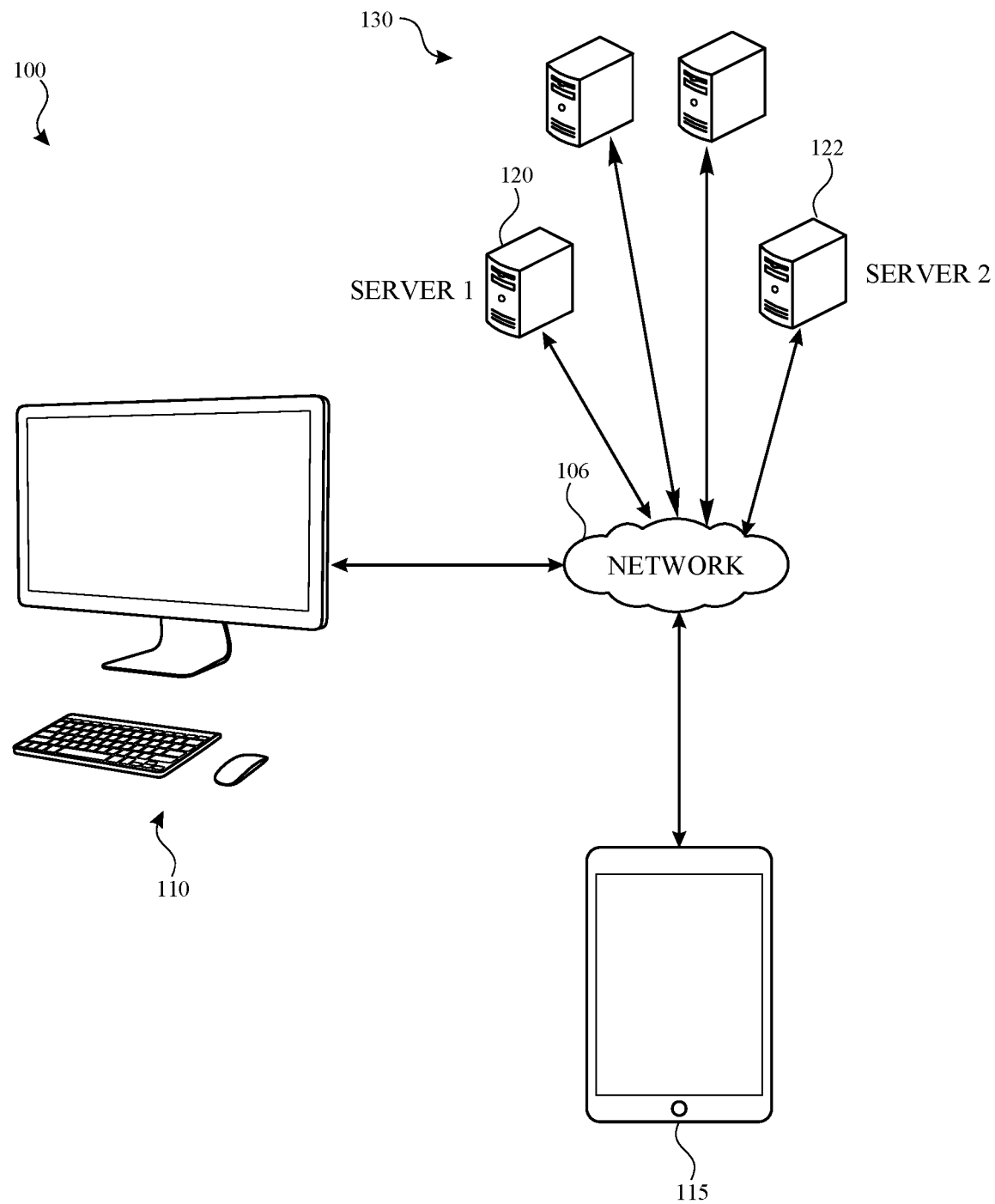
FIG. 1 illustrates an example network environment including an electronic device that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides a tool for graphically developing and/or editing user interfaces that are created from underlying code in a project of an integrated development environment. The tool may further automatically generate code to facilitate development of user interfaces, and/or facilitate directly modify the underlying code related to the user interfaces that are included in the project. The tool also provides modifications to underlying code to facilitate a compiler to support faster previews of changes and edits made to the UIs and/or the underlying code for the UIs without, for example, fully compiling an entire project, which may result in performance benefits for code development by at least reducing processing time for previews. The subject system therefore can decrease a burden on a computer processor and/or device power for processing edits of UIs during development and/or displaying previews of such edited UIs at least because implementations described herein can provide efficiencies across one or more components of the system resulting in improvements that may be realized in an observable and quantifiable manner.

Further, the tool behaves in a dynamically adaptable manner to provide one or more editors, synthesized based on the underlying code, for a given UI that are contextual for a current state of a UI that is being edited. More specifically, the subject system provides a visual tool for editing views defined by source code. In particular, the tool, in at least some implementations, processes source code, and synthesizes one or more editors that are dynamically generated from the source code that is detected. This enables the tool to be dynamically adaptable based on the underlying source code, and forgo requiring the development of custom tools that may be costly and/or complex to implement.

The subject system also improves usability during code development, e.g., a computer-related technology, as is discussed below. For example, implementations of the subject technology forgo requiring the use of a markup language to facilitate code development, which may decrease the difficulty of using a development tool. As an illustration, some developers may prefer working with text, including code in text form, and use a myriad of tools, such as a graphical editor, to work with the text. Some existing graphical editors may use some form of markup. While this offers an ease of implementation for a team of developers creating a development tool (e.g., a graphical editor), the usage of markup can add confusion for the developer (e.g., the user). For example, such a developer may not only have to learn the programming language that the developer is using, such as Swift, but the developer may also have to use this markup language and the terms used within it. For example, it may be difficult to determine whether the example markup of <button title="Foo"/> corresponds to a particular type of button (such as a UIButton, NSButton, some other button as provided by a particular software library or framework). Furthermore, these markup languages may require manual translation. In this example, the team building the tool has to look for "button" and translate that to the appropriate target type in the framework the user is targeting (e.g., NSButton for AppKit, UIButton for UIKit, etc.). Implementations of the subject technology therefore provide usability improvements by avoiding the use of a markup language and/or manual translation in the development process.

In addition, implementations of the subject system enable defining entry points that may not be the root of an application being developed to provide improvements in the development process, such as reducing an amount of time incurred during the development process and therefore improving the efficiency of the development process. Moreover, the subject technology advantageously enables entering the application's code through any viewport. To describe an existing scenario, if a developer is writing code to develop a UI, an edit, run, and debug cycle may be part of the development process. Beyond the time this incurs, in an example, when the developer runs an application, being developed, from the start, a given graphical editing tool may lose the place where the developer was editing the code. In particular, in some existing tools, after every edit the developer may be required to restart from the beginning of the application being developed in order to test a change to the code. Implementations of the subject technology therefore provide usability improvements to mitigate delays in the development process due to the above-described scenario.

Further, in some existing UI tools, after every edit to code the developer may have to compile the code to wait for a result of the edit, which may be avoided by the subject technology as discussed further below. Developers utilize such UI tools because such tools can allow developers to work on a single screen of content and because making changes in such UI tools enable the developers to see the result. As described further below, the subject system enables control of an entry point into code and can provide a rapid turnaround time using a thunking approach by compiling a much smaller amount of the code after every code edit and then waiting for the result as described above (e.g., in some existing UI tools). In particular, implementations of the subject technology, as described further below, enable a user to make an edit(s) to code and provide a rendering of the edit(s) in a very quick amount of time (e.g., under 1 second) in some instances. Furthermore, the existing UI tools may not run the developer's code except in limited circumstances, or may run a simulation of what the code may perform. In implementations of the subject technology, the code, instead of a simulation of the code, may be executed more frequently therefore enabling a rapid turnaround time and improving usability.

In one or more implementations, the tool may work in conjunction with a framework for developing graphical user interfaces, including software libraries provided within such a framework. A framework can refer to a software environment that provides particular functionality as part of a larger software platform to facilitate development of software applications, and may provide one or more application programming interfaces (APIs) that may be utilized by developers to design, in a programmatic manner, user interfaces and to handle operations for such user interfaces including animations and layout of graphical elements. In an example, this framework provides components to implement a graphical, event-driven user interface that includes UI elements (e.g., windows, dialogs, labels, images, buttons, menus, text fields, pickers, sliders, switches, etc.), handles the rendering of UI elements and animations, and communicates with hardware devices and screen buffers. Moreover, the tool may work with one or more existing software libraries that provide access to different functionality. Such a library may be included as part of the framework described above, or as a separate library provided by the system, and can work in conjunction with an integrated development environment.

For example, the framework as described herein enables developers to create "views" for graphical user interfaces (GUIs or UIs) of a computer application. A view can be understood as a visual component of a given application's user interface that can be seen by a user. In the context of code, a view can refer to an object (or some other coding element) that is used to construct a user interface (UI) and display content to a user. In some examples, a view may be interacted with, by a user, in some manner. Moreover, the framework supports a user interface with a hierarchy of views such that at least one view can be included within another view, which can be further utilized to define a layout of views within the user interface and/or other properties associated with a set of views within the hierarchy. In addition, a data structure, such as a tree structure, may be provided to represent such a hierarchy of views in which parent-child relationships between views are established between respective nodes in the tree structure.

FIG. 1 illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes the electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment 100 may include any number of electronic devices and any number of servers or a data center including multiple servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device. In FIG. 1, by way of example, the electronic device 110 is depicted as a desktop computer. The electronic device 110 may be, and/or may include all or part of, the electronic system discussed below with respect to FIG. 12.

The electronic device 115 may be, for example, a portable computing device such as a laptop computer, a smartphone, a content streaming device, a peripheral device (e.g., a digital camera, headphones), a tablet device, a wearable device such as a watch, a band, and the like, any other appropriate device. In FIG. 1, by way of example, the electronic device 115 is depicted as a tablet device with a touchscreen. In one or more implementations, the electronic device 115 may be, and/or may include all or part of, the electronic system discussed below with respect to FIG. 12.

In some implementations, the electronic device 115 may not include a screen and be operative to transmit content from another device (not shown) to a screen. For example, the electronic device 115 may be operative to receive content from a host device in any suitable manner, including any of wired or wireless links. The host device may be any suitable device for providing content to electronic device 115, such as a computer and/or server on which media is stored.

In one or more implementations, the electronic device 110 may provide a software development environment such as a computer program that a software developer can use to create compiled (e.g., executable) code, debug, maintain, or otherwise support computer programs and applications. For example, the software development environment, using the compiled code, can create a software package for deployment on a target device, such as with facilitation from the server 120. In an example, the electronic device 115 may be such a target device for the software package.

The server 120 and/or the server 122 may be part of a network of computers or the group of servers 130, such as in a cloud computing or data center implementation. The server 120, the server 122, and/or the group of servers 130 may store data, such as photos, music, text, web pages and/or content provided therein, etc., that may be accessible on the electronic device 110 and/or the electronic device 115. In one or more implementations, the server 120 deploys the compiled code to a target device for execution. The electronic device 115, in an example, may be a target device for receiving the compiled code and executing the compiled code in a runtime environment of the electronic device 115. In another example, the electronic device 110 may be such a target device. In yet another example, the server 120 (and/or another server) may provide a web service and can perform operations associated with the compiled code, such as complex processing operations.

For providing the tool described herein, an integrated development environment is described, in the following discussion, that implements the functionality for graphically developing and/or editing user interfaces in accordance with one or more implementations.

Figure 2:
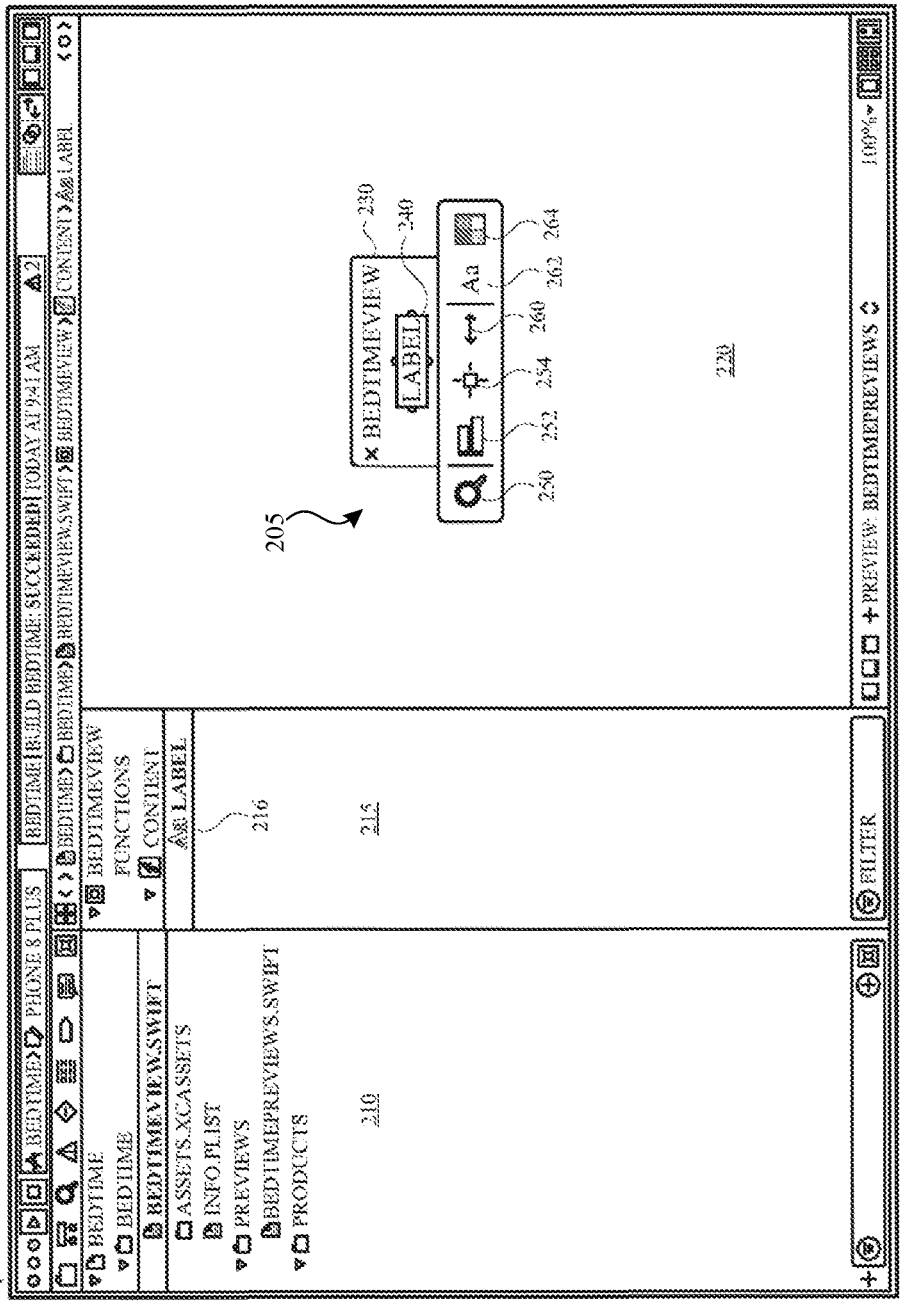
FIG. 2 illustrates an example user interface of an integrated development environment providing a tool for graphically developing user interfaces that may be implemented on an electronic device in accordance with one or more implementations.

FIG. 2 illustrates a user interface 200 of an integrated development environment that provides a tool for graphically developing user interfaces in accordance with one or more implementations. For explanatory purposes, the integrated development environment (IDE) is described as executing on the electronic device 110 of FIG. 1; however, the UI 200 of the IDE may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, the UI 200 of the IDE includes different areas that provide information for a project that is opened for development. As shown, the UI 200 of the IDE includes a graphical area 210 that may include, for the current project, a listing of source files, libraries, frameworks, and/or other assets, and may enable selection of such items for editing and/or viewing. A source code file (e.g., "BedtimeView.swift") related to a view of one or more UI elements is included in the project and currently selected in the graphical area 210.

The UI 200 of the IDE further includes a graphical area 215 that includes code components of the selected source code file from the graphical area 210. Some example code components may include functions, classes, structures, and extensions. In an example, the UI 200 of the IDE may list functions, corresponding to self-contained chunks of code that perform a specific task, in the graphical area 215. As shown, the graphical area 215 includes a listing of a function (e.g., "Content"), from the selected source code file, for rendering a view of a user interface (UI), which may include one or more UI elements. Text (e.g., "Label") indicating a name of a UI element, related to the selected function, is also listed in the graphical area 215. In this example, the text of the name of the UI element has been selected for editing, which causes the UI 200 of the IDE to display a tool 205 in a graphical area 220 for editing the corresponding UI element.

In one or more implementations, one or more editors provided in the tool 205 are dynamically generated based on an analysis of the underlying code associated with a particular UI element as discussed further below. It is appreciated that the tool 205 is implemented as a visual tool for editing views defined by source code. In particular, the tool 205, in at least some implementations, processes source code, and synthesizes one or more editors that are dynamically based on the source code that is detected. This enables the tool to be dynamically adaptable based on the underlying source code, and forgo requiring the development of custom tools that may be costly and/or complex to implement.

As further shown, the UI 200 of the IDE includes the graphical area 220 for displaying the tool 205 for graphically developing the UI using one or more dynamically generated editors based on the underlying code. For example, the tool 205 provides a textual representation of a UI element 240 corresponding to the selected text of the UI element from the graphical area 215. The tool 205 includes a graphical area 230 that includes a graphical rendering of the selected UI element from the graphical area 215 corresponding to the UI element 240.

By analyzing the code from the selected UI element (e.g., source code for a label), the tool 205 provides various graphical elements 250, 252, 254, 260, 262, and 264 respectively corresponding to particular dynamically generated editors for the selected UI element 240. As used herein, the term "editor" may refer to functionality provided by the tool 205 that enables modifying underlying code, related to a selected UI element or UI (e.g., including multiple UI elements), in a substantially graphical manner (e.g., via interactions with the UI provided by the tool 205 and not necessarily direct editing of code), where such an editor is dynamically generated based on the source code associated with a representation of a view of a particular UI element (e.g., the selected UI element 240). As used herein, a given editor may provide one or more "actions" that may be performed on a selected UI element or UI, where the term "action" may refer to a way of editing and/or creating, via the tool 205, the underlying code related to a selected UI element or UI. A given editor may be displayed in a representative form (e.g., icon or menu option within the tool 205), which when selected, may be initiated by the tool 205 and presented for display with additional UI showing different options (e.g., actions) to edit a selected UI element or UI.

In one or more implementations, the graphical element 250 (illustrated in FIG. 2 as a magnifying glass) is provided for accessing a list of all editors and/or providing a search interface for searching all editors, the graphical element 252 corresponds to an editor for alignment, the graphical element 254 corresponds to an editor for an inset (e.g., margins or padding around a UI element), and the graphical element 260 corresponds to an editor for sizing. As further shown, the tool 205 may also include additional editors. For example, the graphical element 262 corresponds to an editor for text, and the graphical element 264 corresponds to an editor for color. As mentioned above, the editor for alignment, editor for an inset, and/or editor for sizing may be dynamically generated by underlying source code that is detected.

In one or more implementations, the tool 205 behaves in a contextual manner such that the tool 205 determines one or more types of options for editing (e.g., dynamically generated editors) depending at least on a type of UI element that is selected (e.g., label text vs. image, etc.) and through analysis of the underlying source code. In this regard, the tool 205 may implement a multilevel query system in which queries are utilized to determine particular types of editors for display for a particular selected UI element. For example, the tool 205 initially queries one or more actions for this particular context (e.g., the selected UI element), which can identify a first number of editors. The tool 205 can then query, at an SDK (software development kit) level, actions that have been added by developers to facilitate integration with additional frameworks and/or software libraries. In at least one implementation, a developer can add additional JSON (JavaScript Object Notation) files in their project to include further actions for a particular view (e.g., custom actions for a custom view). At a third level of querying, the tool 205 can further query for one or more built-in actions for display. The number of editors that are presented by the tool 205 are filtered in scope and, in one example, can be based on priority or some other indication of importance or ranking within the system.

In another example, the number of dynamically generated editors that are presented by the tool 205 is based on a predetermined number of actions, which may be a given fixed number or a variable number (e.g., depending on an amount of free display space available for displaying the editors). Based on one or more of the aforementioned constraints, additional editors may be provided by the tool 205 for the selected UI element. Additionally, in one or more implementations, a list of actions may be generated using machine learning techniques. For example, historical data of prior activity from a user may be utilized to train a machine learning model, and the trained model may make predictions for the type of actions to provide.

Figure 3:
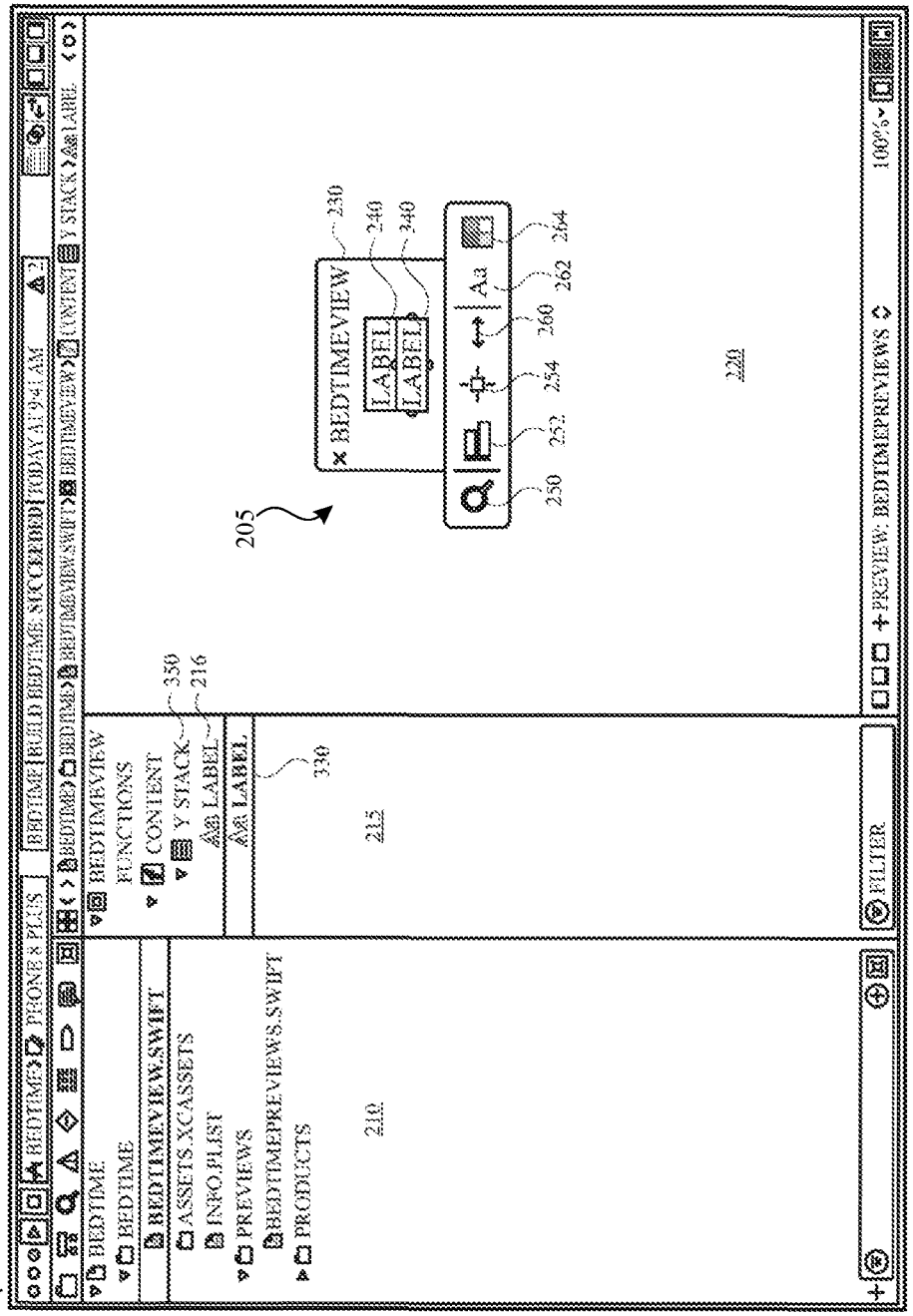
FIG. 3 illustrates an example user interface of an integrated development environment that provides a tool for duplicating a user interface element in accordance with one or more implementations.

FIG. 3 illustrates a user interface 300 of an integrated development environment (IDE) that provides a tool for duplicating a user interface element in accordance with one or more implementations. FIG. 3 includes the same IDE discussed above in FIG. 2.

In one or more implementations, the tool 205 provides duplication of a UI element that is currently selected for editing. In the example of FIG. 3, the UI element 240 is selected for editing and is provided for display in the graphical area 220. In an example, the tool 205 receives a command provided by a user (e.g., a keyboard shortcut and/or combination of keys) that initiates duplication of the UI element 240. To configure a layout of the UI element 240 with the duplicated label, the tool 205 may provide additional graphical elements to enable selection of a horizontal layout (e.g., "X stack") or a vertical layout (e.g., "Y stack"). In this example, the user may select a vertical layout which would subsequently duplicate the UI element 240 and generate a copy of the label for placement below the UI element 240 along a vertical axis (e.g., Y axis). Upon completion of the duplication operation, a new label 340 is provided.

During duplication, the tool 205 generates code based on the selected UI element 240. In one example, the generated code may be a copy of code related to the UI element 240. The generated code may be added to other related code for a view including the UI element 240 and the new label 340. As further shown, the graphical area 215 of the UI 300 of the IDE now includes a view hierarchy related to text 350 indicating a vertical layout (e.g., "Y stack"), with the textual representation of the UI element 240 listed under the text 350 and additional text (e.g., "Label") 330, indicating a name of the new UI element corresponding to the new duplicated label 340, listed under the textual representation of the UI element 240. In another example, the tool 205 may generate code for editing respective text values of the UI element 240 and/or the new label 340 such that the text values are updated within the underlying source code. For example, if the UI element 240 is selected and a user provides input (e.g., keystrokes) to change the text "Label" to some new text value (e.g., "Bedtime"), the tool 205 may directly change the source code to this new text value of "Bedtime". Similarly, if the new label 340 is selected and a user provides input (e.g., keystrokes) to change the text "Label" to some new text value (e.g., "Everyday"), the tool 205 may directly change the source code to this new text value of "Everyday".

FIGS. 4A-4D illustrate example style editors, provided by the tool 205, for editing a style of text of a particular UI element. The particular UI element may be included as code in a project of the IDE in some implementations.

Figure 4A:
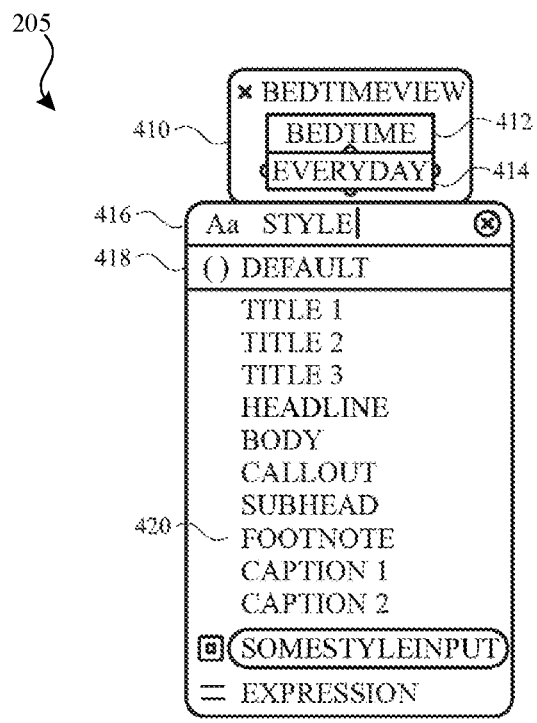
FIGS. 4A-4D illustrate an example style editors, provided by the tool, for editing a style of text of a view of a particular UI.

As illustrated in FIG. 4A, the tool 205 provides for display a representation of a view of a user interface (UI) 410 related to a particular view (e.g., "BedtimeView") of a UI with one or more UI elements. The view includes a first UI element for a label 412 (e.g., "Bedtime") and a second UI element for a label 414 (e.g., "Everyday"). In an example, the view of the UI is provided for display in the IDE when selected for editing (e.g., as discussed in FIGS. 2 and 3).

In one or more implementations, the tool 205 provides for one or more dynamically generated editors for editing of text associated with a particular label based on analyzing source code associated with the particular label. Previously, each of the label 412 and the label 414 have been edited to modify the original text for each of the labels (e.g., as discussed above in FIG. 3). In an example, the tool 205 receives a selection of the label 412 and new user input to modify the corresponding text of the label 412, which the tool 205 then modifies the underlying source code for updating the text of the label 412 to the value of "Bedtime". Similarly, the tool 205 receives a selection of the label 414 and new user input to modify the corresponding text of the label 414, which the tool 205 then modifies the underlying source code for updating the text of the label 414 to the value of "Everyday". The changes to the text of the label 412 and the label 414 are then updated in the IDE such that a listing of the label 412 and the label 414 (e.g., in the graphical area 215) may be updated with the new corresponding labels.

Through analyzing the underlying source code, the tool 205 has provided for display a dynamically generated editor for changing a style of text of a particular selected UI element. In this example, the label 414 has been selected in the view of the UI 410. As discussed above, the tool 205 may provide a set of dynamically generated editors based on the underlying source code of the selected UI element, which may be displayed upon selection of a particular UI element (e.g., the label 414). In an example, the editor for changing a style of text may be initiated upon selection of a particular representation of the editor (e.g., the graphical element 262). As further illustrated in FIG. 4A, an input field 416 enables input to be received for facilitating searches of different styles to apply to text of the selected label 414.

Figure 4B:

In an example, a user can enter in text into the input field 416 for searching for actions based on user input. As input is being received in the input field 416, the tool 205 may provide auto-completion or suggested actions upon key entry. In this example, as shown in FIG. 4B, the user has provided an input for the letter "f" which results in an auto-completed suggestion of "footnote" in the input field 416 and a filtering of a list of actions. To commit the change to the selected label 414, the user may provide a return or enter input into the input field 416. In an example, after the change to the selected label 414 has been committed, the underlying code related to the label 414 is modified in the project of the IDE. In this example, code is generated for the style of the selected label 414 and included in the project.

Figure 4C:
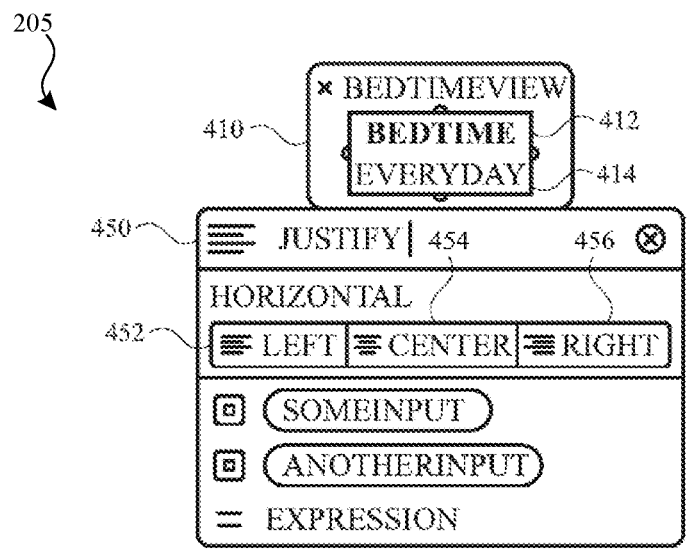

In FIG. 4C, the tool 205 provides a dynamically generated editor for modifying alignment attributes for UI elements from the representation of the view of the UI 410, which includes the label 412 and the label 414. In this example, the tool 205 provides a graphical element 452 corresponding to a command for a left alignment of the view of the UI 410, a graphical element 454 corresponding to a command for a center alignment of the view of the UI 410, and a graphical element 456 corresponding to a command for a right alignment of the view of the UI 410. The user can enter in text into an input field 450 for searching for actions based on user input. As input is being received in the input field 450, the tool 205 may provide auto-completion or suggested actions upon key entry. As shown in FIG. 4C, the user has entered in text (e.g., "Justify") to modify the alignment of the view of the UI 410.

Figure 4D:
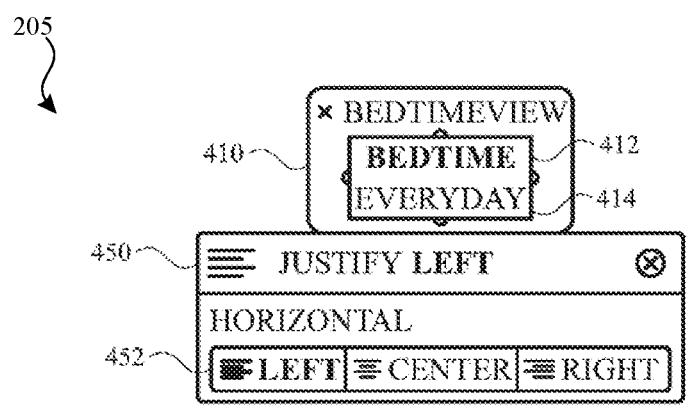

As further shown in FIG. 4D, the user has provided an input for the letter "l" which results in an auto-completed suggestion of "left" in the input field 450. To commit the change to the view of the UI 410, the user may provide a return or enter input into the input field 416. Upon committing the change to the alignment of the view of the UI 410, the tool 205 may highlight the graphical element 452. In this example, code is generated for the alignment of the view of the UI 410 and included in the project.

Figure 5A:
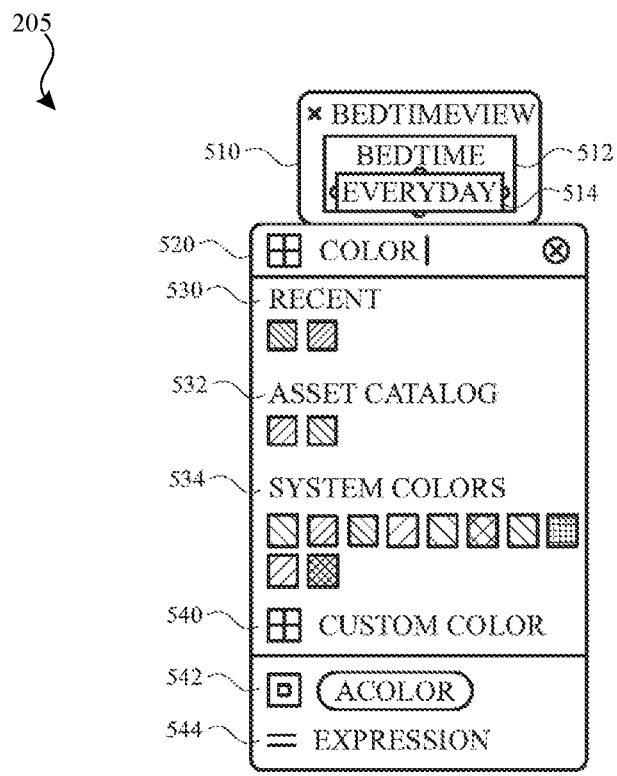
FIGS. 5A-5C illustrate example color editors, provided by the tool, for editing a color of text of a particular UI element.
Figure 5B:
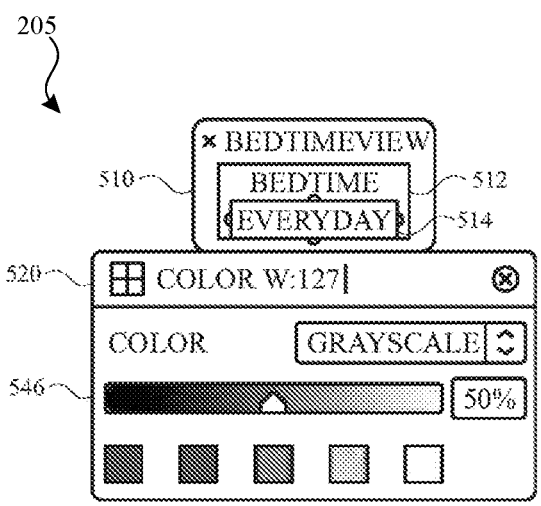
Figure 5C:
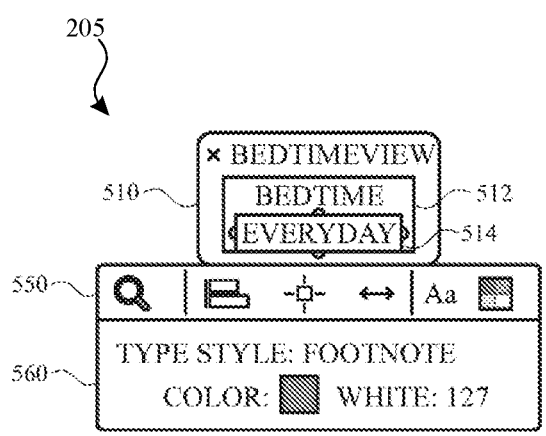

FIGS. 5A-5C illustrate example color editors, provided by the tool 205, for editing a color of text of a particular UI element. The particular UI element may be included as code in a project of the IDE in some implementations.

As illustrated in FIG. 5A, the tool 205 provides for display a representation of a view of a user interface (UI) 510 related to a particular view (e.g., "BedtimeView") of a UI with one or more UI elements. The view includes a first UI element for a label 512 (e.g., "Bedtime") and a second UI element for a label 514 (e.g., "Everyday"). In an example, the view of the UI is provided for display in the IDE when selected for editing (e.g., as discussed in FIGS. 2 and 3).

By analyzing underlying source code, the tool 205 has provided for display a dynamically generated editor for changing a color of a particular selected UI element. In this example, the label 514 has been selected in the view of the UI 510. As discussed above, the tool 205 may provide a set of dynamically generated editors based on the source code of the selected UI element, which may be displayed upon selection of a particular UI element (e.g., the label 514). In an example, the editor for changing a color may be initiated upon selection of a particular representation of the editor in the tool 205 (e.g., the graphical element 264).

The editor for color in FIG. 5A includes a set of recently used colors 530, a set of asset catalog colors, a set of system colors, and a custom color 540. The editor also includes an option 542 for an input (e.g., a variable that the developer has defined in the code), and an option 544 for providing input for an expression using code (e.g., "color=[some color value or code]"). An asset catalog, as used herein, refers to a particular file type that stores image, color, and other assets that are then compiled into a compact binary representation. Although the example of an asset catalog is discussed, it is appreciated that the subject technology can work with any media provided by the user whether that comes from an asset catalog, from files on the disk, or some other representation and/or source.

As further illustrated in FIG. 5A, an input field 520 enables input to be received for a color to apply to text of the selected label 514. In this example, as shown in FIG. 5B, the user has provided an input for the characters "w:127" in the input field 520, which corresponds to a white color 127. After entry of the characters, the tool 205 may provide other color editors 546 as further shown in FIG. 5B. To commit the change to the selected label 514, the user may provide a return or enter input into the input field 520. In an example, after the change to the selected label 514 has been committed, the underlying code related to the label 514 is modified in the project of the IDE. In this example, code is generated for the color value of the selected label 514 and included in the project.

In FIG. 5C, the tool 205 now provides a set of graphical elements 550 representing different dynamically generated editors for the selected label 514, and a graphical area 560 including color and type style information related to the selected label 514. The user may then select one of the graphical elements 550 to further edit the selected label 514.

Figure 6A:
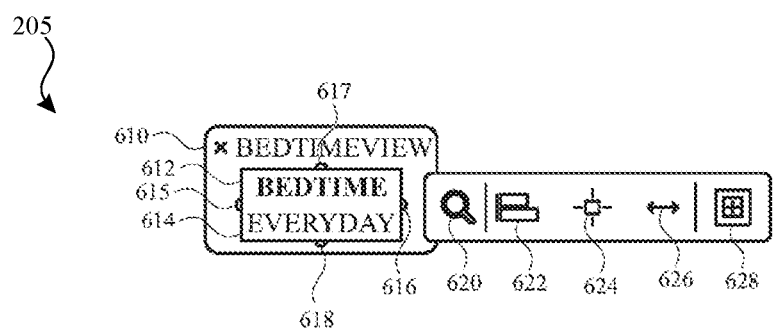
FIGS. 6A-6C illustrate example editors, provided by the tool, for inserting a new UI element into a view of one or more UI elements.
Figure 6B:
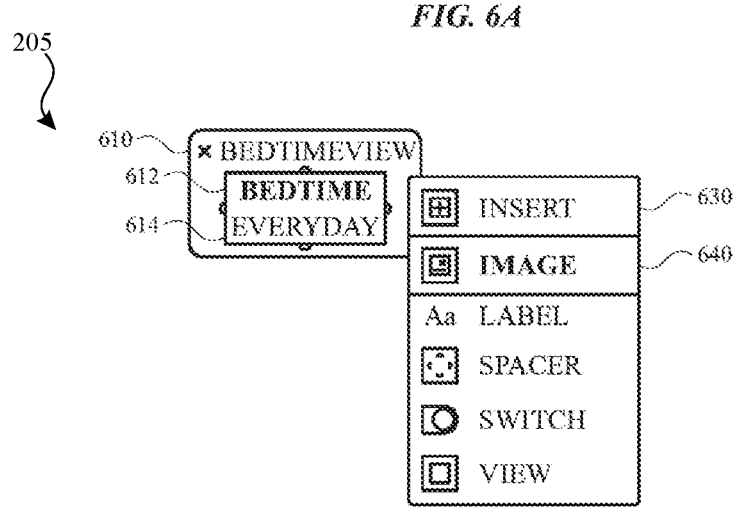
Figure 6C:
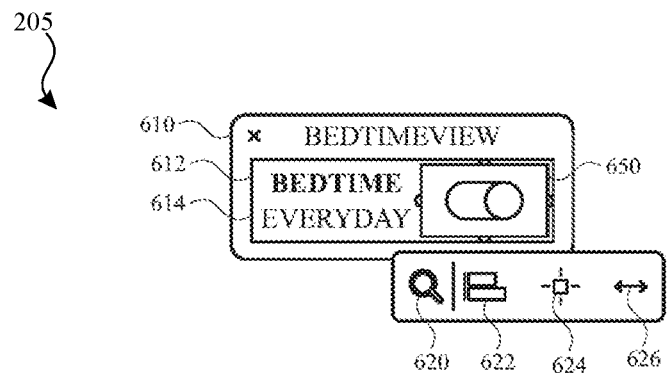

FIGS. 6A-6C illustrate example editors, provided by the tool 205, for inserting a new UI element into a view of one or more UI elements. The UI elements may be included as code in a project of the IDE in some implementations.

As illustrated in FIG. 6A, the tool 205 provides for display a representation of a view of a user interface (UI) 610 related to a particular view (e.g., "BedtimeView") of a UI with one or more UI elements. The view includes a first UI element for a label 612 (e.g., "Bedtime") and a second UI element for a label 614 (e.g., "Everyday"). In an example, the view of the UI is provided for display in the IDE when selected for editing (e.g., as discussed in FIGS. 2 and 3).

As further illustrated in FIG. 6A, a user has selected a graphical element 616 (e.g., a right "ear") which corresponds to a command to present a set of dynamically generated editors for editing a right edge of the label 612 and the label 614. The tool 205 may analyze source code corresponding to the graphical element 616 and dynamically generate one or more editors. After selection of the graphical element 616, the tool 205 provides graphical elements 620, 622, 624, 626, and 628 corresponding to different representations of dynamically generated editors. The user selects the graphical element 628 related to a dynamically generated editor for inserting a new UI element to the right of the right edge of the label 612 and the label 614.

Although in the example of FIG. 6A the graphical element 616 was selected for editing the right edge, the tool 205 also provide for editing different edges of the labels (or any other selected UI element) upon selection of a particular graphical element as the different edges can correspond to different contexts from which the tool 205 can make a determination for dynamically generating one or more editors. For example, a graphical element 615 (e.g., left "ear") is provided for editing a left edge, a graphical element 617 (e.g., top "ear") is provided for editing a top edge, and a graphical element 618 (bottom "ear") is provided for editing a bottom edge. Similarly, upon selection one of these graphical elements, the tool 205 may provide a set of dynamically generated editors for applying to the selected edge.

In FIG. 6B, the tool 205 provides the editor for inserting a new UI element, which also lists various types of UI elements (e.g., image, label, spacer, switch, view, etc.) for inserting. A graphical element 640, corresponding to a command for inserting an image, is initially selected in FIG. 6B. An input field 630 enables input to be received for a particular type of UI element to insert. As input is being received in the input field 630, the tool 205 may provide auto-completion or suggested actions upon key entry. In an example, the user has provided an input for the characters "sw" which results in an auto-completed suggestion of "switch" in the input field 630 and a filtering of the list of UI elements. To commit the inserting a switch to the right of the right edge of the labels 612 and 614, the user may provide a return or enter input into the input field 630. In an example, after the change to the view has been committed, the underlying code related to the view is modified in the project of the IDE. In this example, code is generated for the switch and included in the project.

In FIG. 6C, a graphical element corresponding to a switch 650 has been inserted into the view along the right edge of the label 612 and the label 614. By analyzing the underlying source code corresponding to the switch 650 including in the project, the tool 205 provides graphical elements 620, 622, 624, and 626 corresponding to various dynamically generated editors for the switch 650.

Figure 7A:
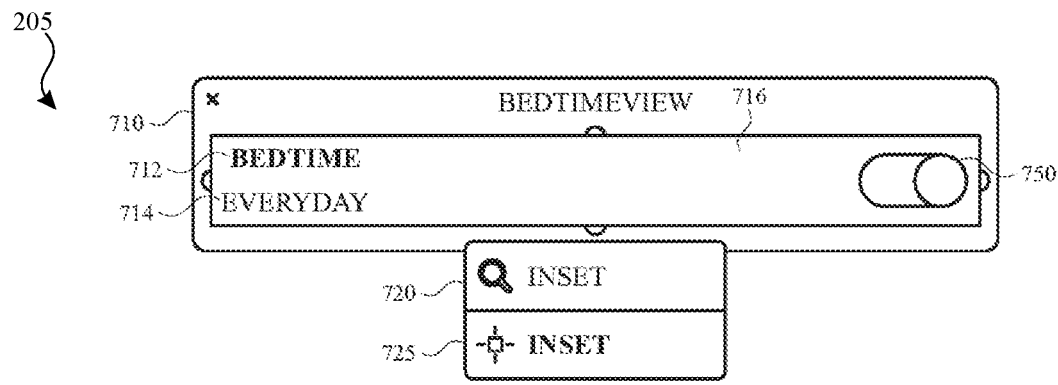
FIGS. 7A-7C illustrate example editors, provided by the tool, for including a new UI element related to an inset into a view of one or more UI elements.
Figure 7B:
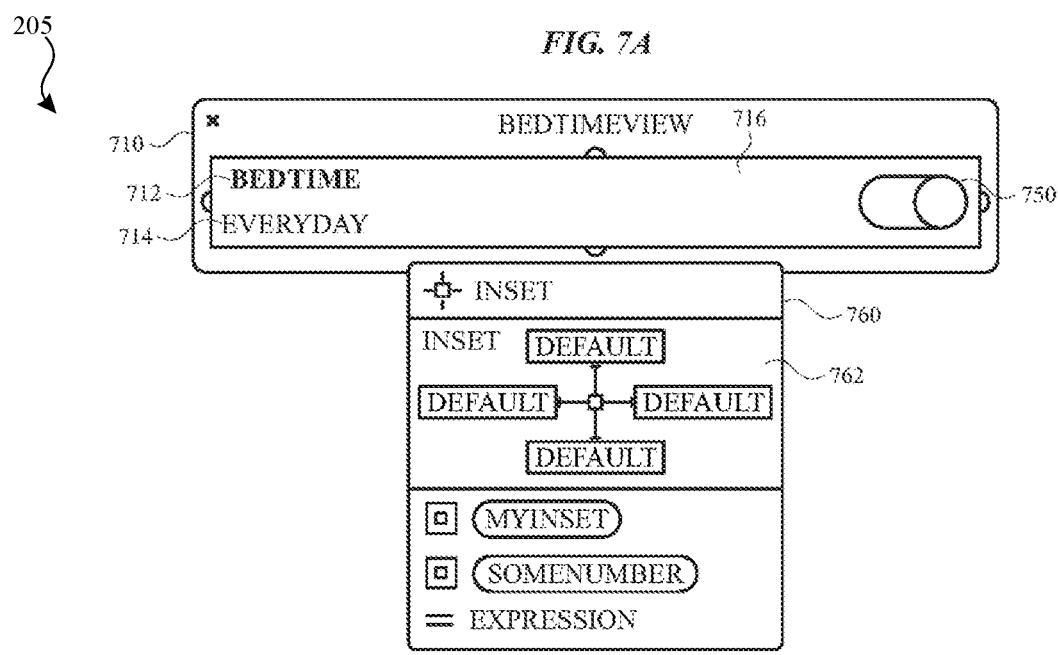
Figure 7C:
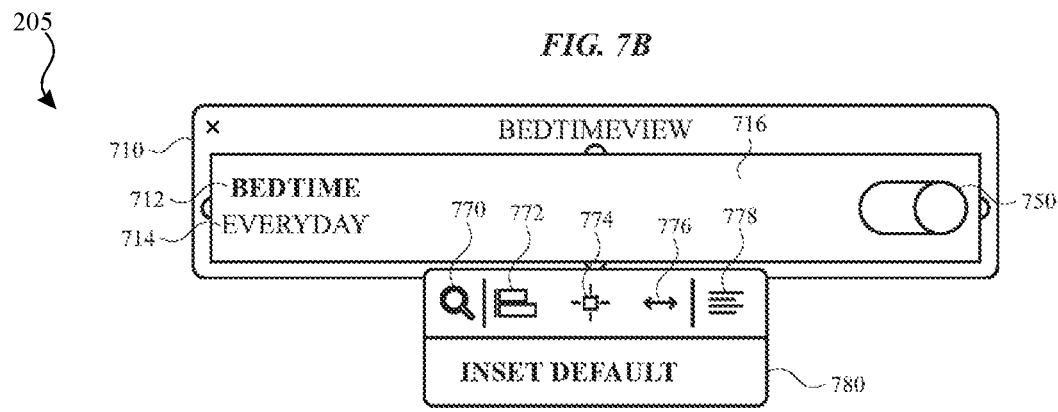

FIGS. 7A-7C illustrate example editors, provided by the tool 205, for including a new UI element related to an inset into a view of one or more UI elements. The UI elements may be included as code in a project of the IDE in some implementations.

As illustrated in FIG. 7A, the tool 205 provides for display a representation of a view of a user interface (UI) 710 related to a particular view (e.g., "BedtimeView") of a UI with one or more UI elements. The view includes a first UI element for a label 712 (e.g., "Bedtime") and a second UI element for a label 714 (e.g., "Everyday"), a third UI element for a spacer 716 (e.g., blank space or borderless empty view), and a fourth UI element for a switch 750. In an example, the view of the UI is provided for display in the IDE when selected for editing (e.g., as discussed in FIGS. 2 and 3).

The view of the UI 710, including all of the UI elements, may be selected for editing (e.g., by selecting a command corresponding to a magnifying glass). Further in FIG. 7A, the tool 205 provides a text input 720 where the user has provided an input for the characters "inset" which results in an auto-completed suggestion 725 of an inset editor in the input field 630. To initiate the inset editor, the user may select the text of the auto-completed suggestion 725.

As illustrated in FIG. 7B, based on analyzing the code associated with the selected UI elements, the tool 205 invokes a dynamically generated editor that includes an input field 760 and a graphical area 762 with various graphical elements for editing an inset of the UI elements included in the view of the UI 710. The graphical area 762 indicates that, as currently configured, an inset with a default set of values for each edge of the view of the UI 710 would be applied to the view of the UI 710.

To commit the inserting an inset for each edge of the view of the UI 710, the user may provide a return or enter input into the input field 760. In an example, after the change to the view of the UI 710 has been committed, the underlying code related to the view of the UI 710 is modified in the project of the IDE. In this example, code is generated for the inset and included in the project.

As illustrated in FIG. 7C, the view of the UI 710 is displayed with the additional inset around the UI elements for the label 712, the label 714, the spacer 716, and the switch 750. In FIG. 7C, based on analyzing source code for the inset, the tool 205 now provides a set of graphical elements 770, 772, 774, 776, and 778 representing different dynamically generated editors for the selected view of the UI 710, and a graphical area 780 including information related to the newly included inset. The user may then select one of the graphical elements 770, 772, 774, 776, and 778 to further edit the selected view of the UI 710.

Figure 8:
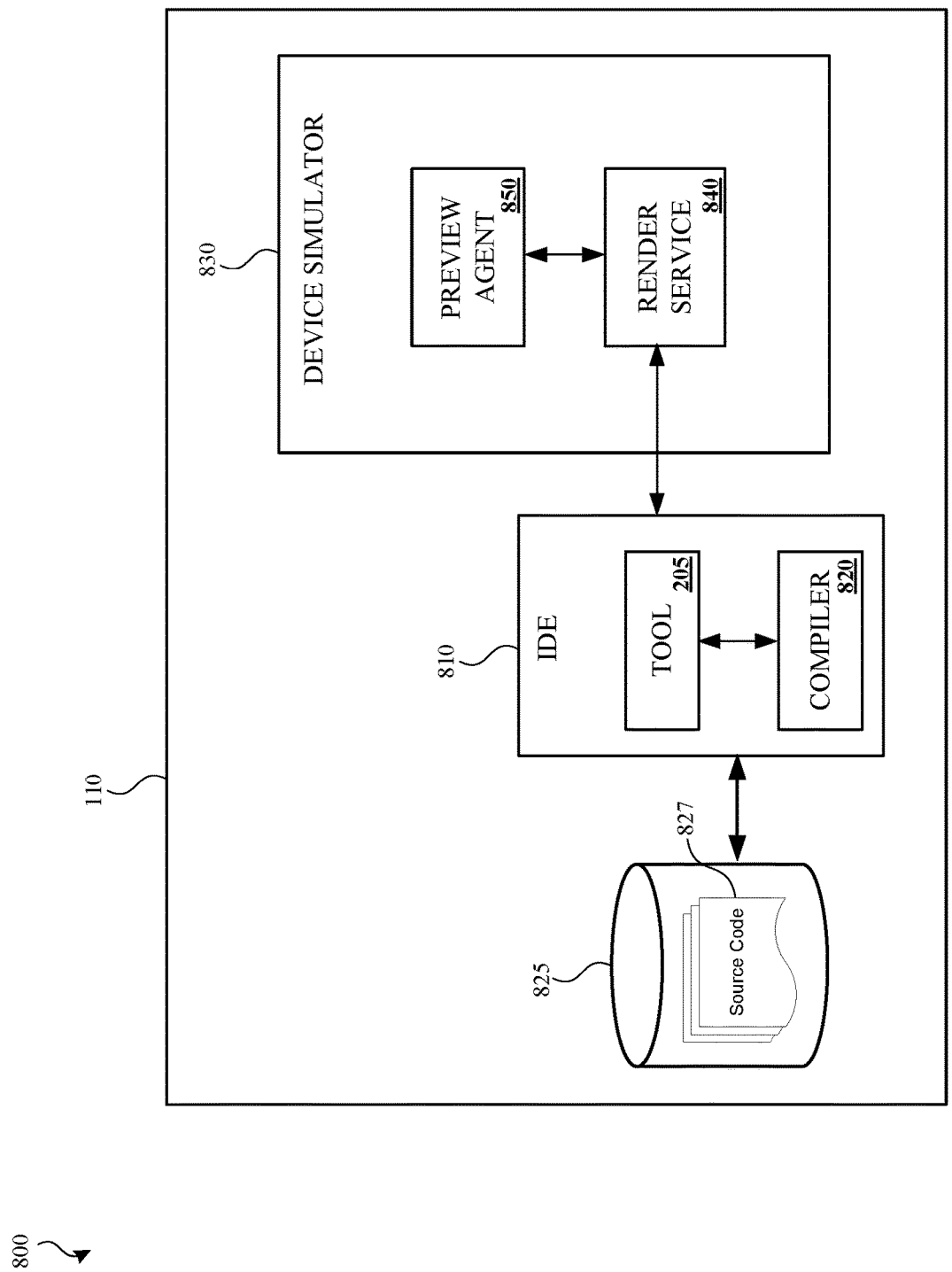
FIG. 8 illustrates an example visual editor system for compiling and rendering a preview of a view of a UI that works in conjunction with the tool of the subject system which may be executed on an electronic device.

FIG. 8 illustrates an example visual editor system 800 for compiling and rendering a preview of a view of a UI that works in conjunction with the tool 205 which may be executed on the electronic device 110.

In one or more implementations, the visual editor system 800 includes an IDE 810 that modifies and compiles source code to support immediate previews of UI code changes. As further illustrated in FIG. 8, the visual editor system 800 includes a storage 825 which stores source code files 827 and/or other data related to software development projects of the IDE 810 in memory.

The IDE 810 include a tool 205 for providing dynamically generated editors of UI elements as discussed in the figures above. The tool 205 works in conjunction with a compiler 820 for compiling the source code files 827 into executable compiled code for rendering one or more UIs.

In one or more implementations, the visual editor system 800 includes a device simulator 830 which may be provided for simulating a target device of a project in the IDE 810. The device simulator 830 includes a render service 840 which communicates with the tool 205. In an example, the render service 840 may launch a preview agent 850 which can instantiate a preview for a view of a UI included in the compiled code from the IDE 810.

The compiler 820 parses source code from one or more of the source code files 827, and generates an abstract syntax tree (AST) file in an example. Before compiling the source code, the tool 205 modifies the source code to support previews of code changes that affect UI elements. The discussion below relates to using the Swift programming language and/or code elements that are supported by Swift. However, it is appreciated that other programming languages may be utilized and Swift is used for purposes of explanation in the examples below.

In an example, for a given source code file with code for a view (e.g., a Swift struct) of a UI and a function for rendering the view of the UI, the tool 205 may add a static variable for a function pointer to a thunk implementation that the tool 205 will subsequently generate to support faster previews of code changes to code related to the view. As referred to herein, a Swift struct (or Swift structure) is a general-purpose, flexible coding construct that is a building block of an application's code. Properties and functions (e.g., methods) may be defined in a given Swift struct to add functionality to the Swift struct. Additionally, in some examples, thunk implementations of classes, enumerations, and extensions may be provided.

In an example where a Swift struct is used for defining the view of the UI, for every single function inside the Swift struct, the tool 205 inserts a conditional jump to the aforementioned function pointer to a corresponding thunk implementation. During runtime, if the function pointer points to a thunk implementation that exists, then the function jumps to the thunk; otherwise the original implementation of the function is executed.

For each function in the Swift struct, an extension is created, which is mostly a duplicate of the original function. In the Swift programming language, an extension can add new functionality to an existing class, structure, enumeration, or protocol type. The extension, in an example, creates a new function for the thunk implementation.

To support rendering a preview of the thunk implementation, the tool 205 creates a preview class, which is a special type of view for rendering the preview of view associated with the thunk implementation. The preview class, in an example, creates an entry point into the code, which controls the exact entry point into the code of main source file in the project. In one or more implementations, the preview class is mostly empty, and includes code to instantiate the function from the thunk implementation. In an implementation, the tool 205 may create a struct (e.g., a preview struct) instead of a class. In an example, the preview includes a function to create a view hierarchy and metadata related to which target device to run on. This metadata can either be supplied on the definition of the preview, or for a particular instance of a preview definition. Further, the metadata is used to determine a particular rendering device to send the preview class or struct. Alternatively, the tool 205 can select a "default" device based on current properties of the current computing device executing the IDE 810.

In an example, the preview class is globally addressable such that an instance of one of these structs/classes may be created from only a string. One or more APIs and compiler libraries provided by the subject technology can provide methods for providing the preview class that is globally addressable assuming the textual name of the struct/class is able to be resolved. Additionally, it is appreciated that a definition of a preview (e.g., what the preview is showing) is separate from an instance of a preview (e.g., where or which target that the preview is to be displayed on).

Further, in an implementation, the definition of a preview may now be a particular protocol that may be conformed to. For example, a struct or class may be created that conforms to a protocol called "Previewable", and implements a particular method. In this manner, this enables the developer to precisely control the preview, or the viewport for showing the view hierarchy.

In one or more implementations, the compiler 820 compiles the source code with the additional generated code discussed above to a target platform (e.g., a platform associated with the device simulator 830). The compiler 820 may include a preview dylib (dynamic library) that gets loaded at runtime for facilitating rendering of the preview. The compiler 820 fills in the function pointers with the versions provided by the thunk implementation. Additionally, at least one implementation supports loading an application bundle (e.g., a mobile device application, and may be compiled with special flags for specifying one or more options) or a framework bundle (e.g., a different version of a dylib). In this fashion, any code, which is dynamically loadable, may be loaded into the preview agent 850.

The device simulator 830 is then executed in connection with providing a preview and executing the compiled code. In one or more implementations, three pieces of compiled code are sent over from the compiler to the device simulator 830: 1) the original struct with the original function, 2) the extension with the thunk implementation, and 3) the preview struct. The render service 840, inside the device simulator 830, may handle communication between the preview agent 850 for a physical device and/or a virtual device. In one more implementations, the preview agent 850 instantiates the preview for rendering the view of the UI. In an example, the preview executes the code for the original implementation, which includes the function pointer to the thunk code, jumps to thunk code for the function, and executes the thunk code which returns a view of the UI. The render service 840 then renders the returned view, which provides the view of the UI (e.g., image, label, etc.) and this is passed back to the IDE 810 for display.

In one or more implementations, the IDE 810 detects edits to the source code, based on direct code edits and/or commands received by the tool 205, to support immediate previews of UI code changes. As discussed below, direct code edits occur when a user directly changes source code via text entry (e.g., one or more characters received using keystrokes). Although the below discussion relates to the IDE 810, it is appreciated that in at least one implementation, the below discussed operations may be performed in response to the tool 205 receiving at least one command that, upon execution, results in at least one edit to the source code. Further, it is appreciated that, in at least one implementation, any other occurrence that results in at least one edit to the source code such as an update performed by a source code management system may initiate the below operations to be performed.

For direct code edits that are received (e.g., via inputted keystrokes) to the code in the source code file, the IDE 810 may parse the edited code. In one or more implementations, the IDE 810 determines a difference between original code and edited code. If the IDE 810 determines that code related to the function changed, the corresponding thunk implementation is recompiled by the compiler 820. By only recompiling the thunk implementation, the IDE 810 may improve performance by reducing the time in which an updated preview is provided based on the modified thunk implementation. In an example where recompiling each source code file in the project and providing an updated preview takes a total time of 8 seconds, the tool 205 may be able to provide an updated preview based on the compiler 820 only recompiling the thunk implementation in an amount of time under 1 second (e.g., 400 ms).

In another example, if the IDE 810 determines that a literal value has changed, recompiling the code can be avoided and the following is performed instead. In the Swift programming language, a literal value refers to the source code representation of a value of a type, such as a number or string. The IDE 810 accesses an incremental values table which may be a separate data structure implemented as maps of strings to values (e.g., a dictionary). In example, a string stored in the incremental values table may correspond to a lookup key for a literal value included in a function inside a thunk implementation. In an implementation, the function, inside the thunk implementation, may include code referencing the incremental values table where the code includes the lookup key to obtain a value for the literal value from the incremental values table. Using the lookup key, the IDE 810 may then update the literal value in the function with an updated value to be included in the incremental values table.

In the subject system, the lookup key is a semi-stable address to a node in the AST. For example, the following code may be provided:

```
struct Foo {
    func bar( ) -> Int {
        let x = 8
        return someFunction(baz: x, qux: 9, quib: 18)
    }
}
```

Based on the above code, the address or lookup key of "9" could be described as the following: 1) inside the struct Foo, 2) inside the function bar, 3) inside the return statement and after "x", and 4) inside the function call argument "qux" which is after "baz" and before "quib".

In an example, the preceding code may translate to the following lookup key:
[@struct, Foo, 0, last].[@func, bar, 0, last]. [@return, someFunction, 1, +x, last].arg[qux, 1, +baz, −quib]

The lookup key is considered semi-stable in that even if the code changes slightly, different variations of the lookup in priority order may be utilized to resolve the value. For example, the code may have changed to the following:

```
struct Foo {
    func bar( ) -> Int {
        let x = 8
        let y = someFunction(baz: x, nob: 9, quib: 18)
        return y
    }
}
```

In this example, the character "9" may be located using the same lookup key because the "9" is still in a struct called Foo, in a function called bar, and not in a return statement after the code change, but instead in a statement after "x", and no longer as an argument "qux", but after "baz" and before "quib"

The IDE 810 may send a message to the device simulator 830 with the new literal value and the lookup key. The message with the new literal value and the lookup key gets passed to the preview agent 850, which then executes the previously compiled code and uses the lookup key to find the updated value in the incremental values table. By avoiding re-compiling the code, the IDE 810 may improve performance by reducing the time in which an updated preview is provided based on the modified literal value. In an example where recompiling the thunk implementation in the project and providing an updated preview takes a total time of 400 ms, the IDE 810 may be able to provide an updated preview based on the updated value in the incremental values table in an amount of time around 4 ms (e.g., an improvement of one-hundred fold).

Alternatively, the IDE 810 may rebuild the entire project (e.g., by invoking the compiler 820) if nothing in the function and literal value changed, and it was determined that changes to the source code occurred elsewhere (e.g., different source code file).

In one or more implementations, for edits that are performed using the tool 205 (e.g., in a graphical manner without directly editing source code itself in the IDE 810), the following operations may be performed. The tool 205 may receive a command to modify a particular UI element. To more quickly provide an updated preview based on the command, the tool 205 may utilize a particular type of abstract syntax table provided by the compiler 820. The compiler 820, when parsing a given source code file, may generate a data structure called an abstract syntax tree based on the source code. The abstract syntax tree (AST) refers to a tree representation of the syntactic structure of the source code in which each node of the tree can correspond to a coding construct occurring in the source code. The compiler 820 may generate a simplified version of the AST which has location information in the code for locations of particular expressions in the code.

When a user interaction for editing a UI element is received by the tool 205 (e.g., selecting a label with an inset), the tool 205 determines or identifies code in the project related to the UI element (e.g., code related to the selected label). In an example, the tool 205 may further automatically generate an inspector UI (e.g., for displaying one or more properties associated with the selected UI element) based on the syntax of the code. After receiving an edit of an expression in the tool (e.g., changing a literal value of text of a label), the tool 205 may search the AST for code and find the expression and its associated location information. The tool 205 may then update the value of the expression using the location information from the AST.

Figure 9:
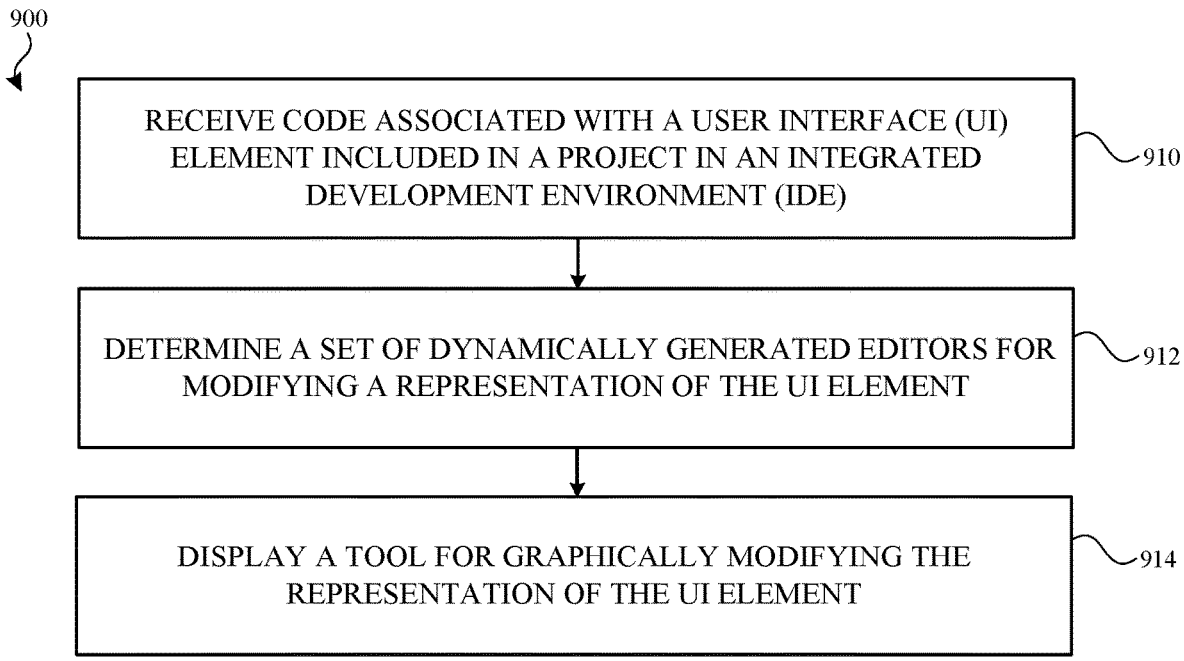
FIG. 9 illustrates a flow diagram of an example process of displaying a tool for graphically modifying a UI element for performing on an electronic device in accordance with one or more implementations.

FIG. 9 illustrates a flow diagram of an example process 900 of displaying a tool for graphically modifying a UI element for performing on the electronic device 110 in accordance with one or more implementations. For explanatory purposes, the process 900 is primarily described herein with reference to the electronic device 110 of FIGS. 1 and 8, the IDE 810 in FIG. 8, and/or the visual editor system 800 and components therein described above in FIG. 8. However, the process 900 is not limited to the electronic device 110, and one or more blocks (or operations) of the process 900 may be performed by one or more other components of other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

The IDE 810 receives a code associated with a user interface (UI) element. The code is included in a project in the IDE 810 (910). In an example, the code is received in response to a selection of a representation of the UI element (e.g., as discussed in FIGS. 3-7C) as a user may provide input while interacting with the IDE 810.

The IDE 810 determines a set of dynamically generated editors for modifying a representation of the UI element based on the code associated with the UI element (912). In an example, determining the set of dynamically generated editors is based at least in part on contextual information related to the UI element and/or querying for a set of actions associated with the UI element. In another example, the IDE 810 may invoke a tool (e.g., the tool 205) based on the code, and the tool may determine the set of dynamically generated editors for modifying the representation of the UI element.

The IDE 810, displays a tool (e.g., the tool 205) for graphically modifying the representation of the UI element (914). In an example, the tool includes a set of graphical elements corresponding to the determined set of dynamically generated editors (e.g., as discussed in FIGS. 3-7C). When the representation of the UI element is graphically modified, e.g. via the set of dynamically generated editors, the code in the project associated with the representation of the UI element is transformed to reflect the graphical modification. For example, code may be generated and included in the project based on the graphical modification from one or more of the dynamically generated editors.

Figure 10:
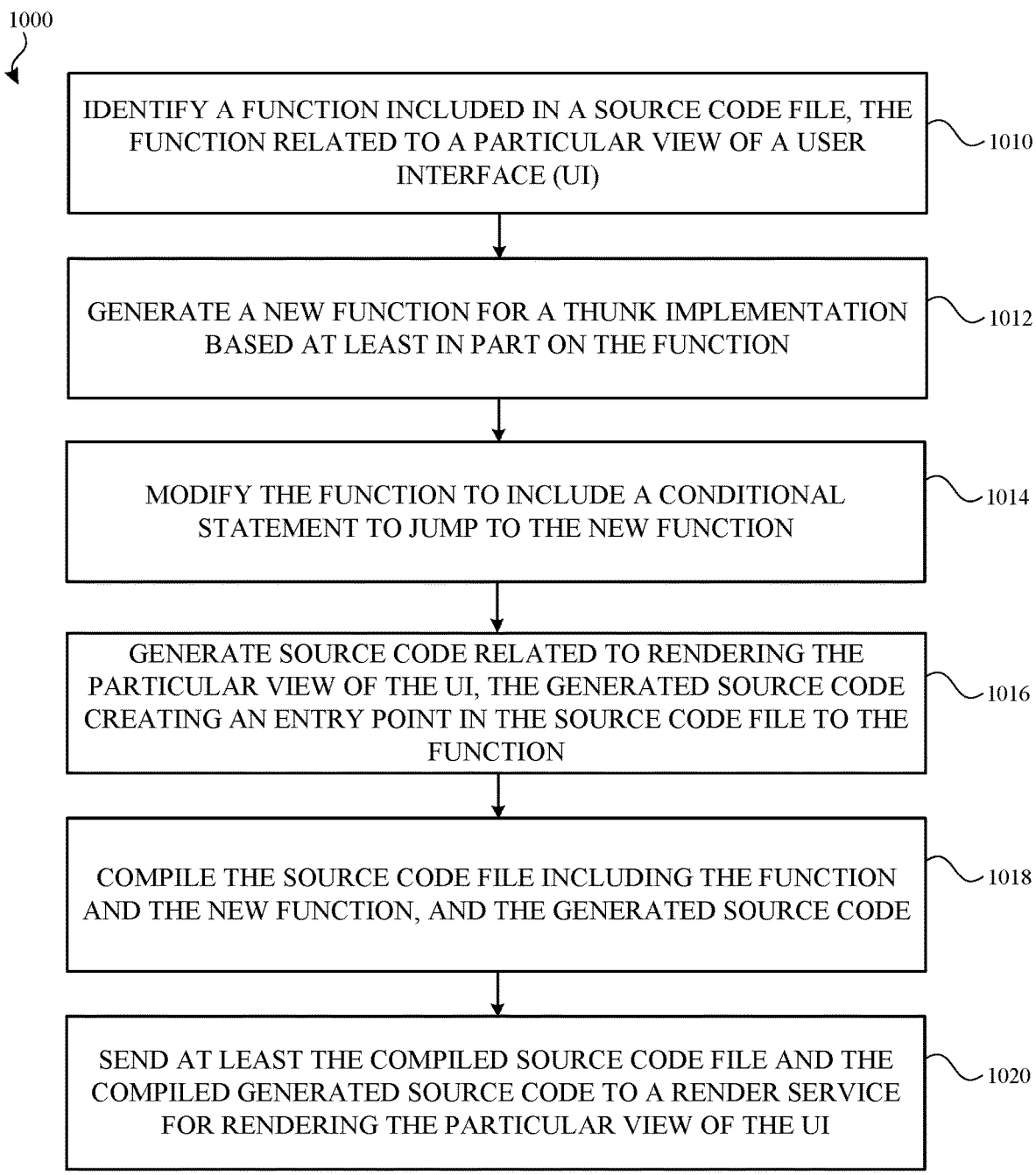
FIG. 10 illustrates a flow diagram of an example process of generating code to render a preview of a UI element for performing on an electronic device in accordance with one or more implementations.

FIG. 10 illustrates a flow diagram of an example process 1000 of generating code to render a preview of a UI element for performing on the electronic device 110 in accordance with one or more implementations. For explanatory purposes, the process 1000 is primarily described herein with reference to the electronic device 110 of FIGS. 1 and 8, the IDE 810 in FIG. 8, and/or the visual editor system 800 and components therein described above in FIG. 8. However, the process 1000 is not limited to the electronic device 110, and one or more blocks (or operations) of the process 1000 may be performed by one or more other components of other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

The tool 205 identifies a function included in a source code file, the function related to a particular view of a user interface (UI) (1010). The tool 205 generates a new function for a thunk implementation based at least in part on the function (1012). As discussed above (e.g., in FIG. 8), for a given source code file with code for a view of a UI and a function for rendering the view of the UI, the tool 205 may add a static variable for a function pointer to a thunk implementation that the tool 205 will subsequently generate to support faster previews of code changes to code related to the view. The tool 205 modifies the function to include a conditional statement to jump to the new function (1014). In an example, the tool 205 inserts a conditional jump to a function pointer to a corresponding thunk implementation. During runtime, if the function pointer points to a thunk implementation that exists, then the function jumps to the thunk. The tool 205 generates source code related to rendering the particular view of the UI, the generated source code creating an entry point in the source code file to the function (1016). For example, an extension is created, which is mostly a duplicate of the original function. The tool 205 compiles the source code file including the function and the new function, and the generated source code (1018). Further, the tool 205 sends at least the compiled source code file and the compiled generated source code to a render service (e.g., the render service 840) for rendering the particular view of the UI (1020).

Figure 11:
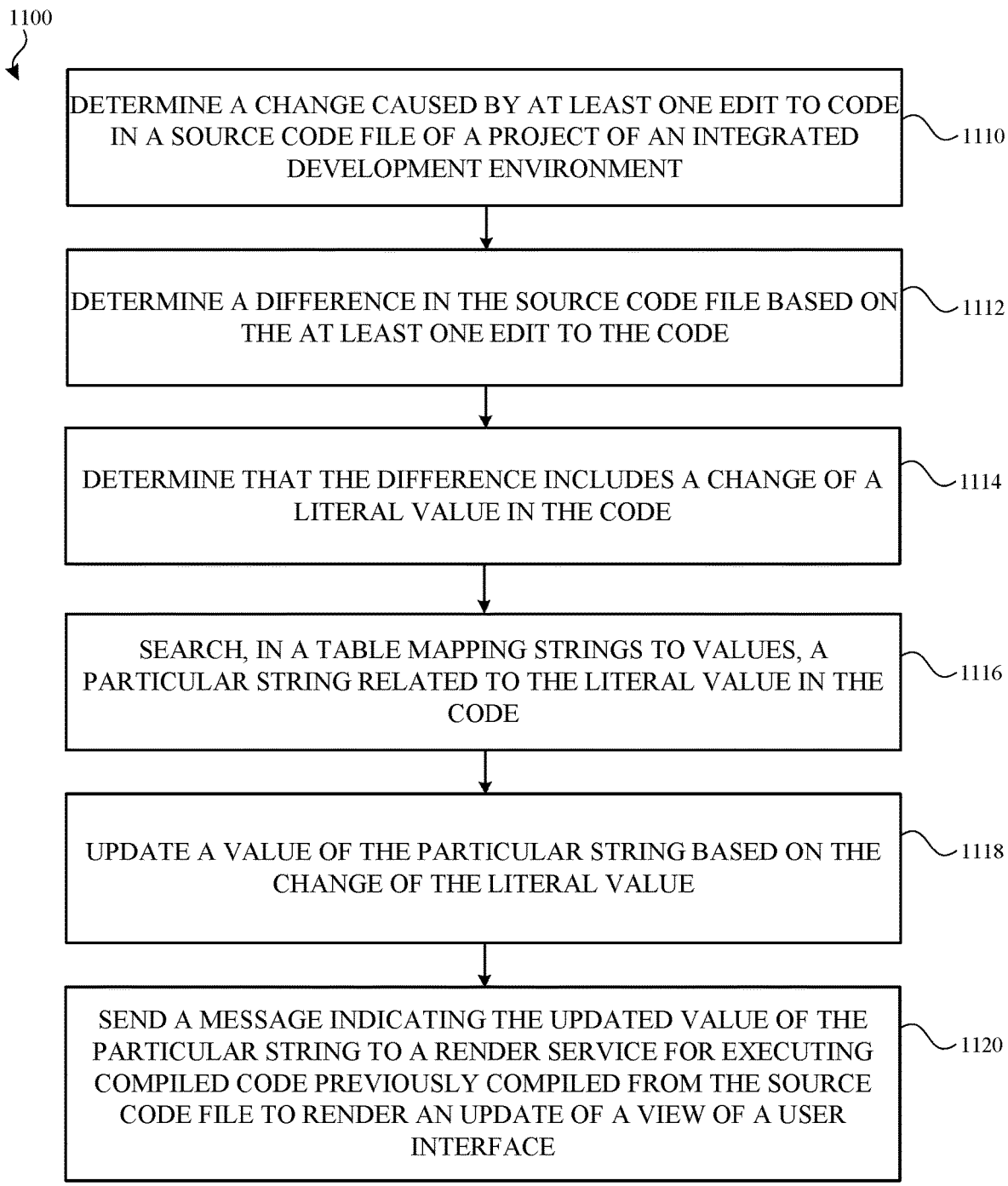
FIG. 11 illustrates a flow diagram of an example process of determining changes to a literal value of code to render a preview of a UI element with an updated literal value for performing on the electronic device in accordance with one or more implementations.

FIG. 11 illustrates a flow diagram of an example process 1100 of determining changes to a literal value of code to render a preview of a UI element with an updated literal value for performing on the electronic device 110 in accordance with one or more implementations. For explanatory purposes, the process 1100 is primarily described herein with reference to the electronic device 110 of FIGS. 1 and 8, the IDE 810 in FIG. 8, and/or the visual editor system 800 and components therein described above in FIG. 8. However, the process 1100 is not limited to the electronic device 110, and one or more blocks (or operations) of the process 1100 may be performed by one or more other components of other suitable devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

The IDE 810 determines a change caused by at least one edit to code in a source code file of a project of an integrated development environment (1110). In an example, the IDE 810 may parse the edited source code file to determine the change occurred. The IDE 810 determines a difference in the source code file based on the at least one edit to the code (1112). If the IDE 810 determines that code related to the function changed, the corresponding thunk implementation is recompiled by the compiler 820. Alternatively, if the IDE 810 determines that a literal value has changed, recompiling the code can be avoided. The IDE 810 determines that the difference includes a change of a literal value in the code (1114). The IDE 810 searches, in a table mapping strings to values, a particular string related to the literal value in the code (1116). In an example, the table may be an incremental values table as discussed above in FIG. 8. In example, a string stored in the incremental values table may correspond to a lookup key for a literal value included in a function inside a thunk implementation.

The IDE 810 updates a value of the particular string based on the change of the literal value (1118). For example, using the lookup key, the IDE 810 may then update the literal value in the function with an updated value to be included in the incremental values table. Further, the IDE 810 sends a message indicating the updated value of the particular string to a render service (e.g., the render service 840 of the device simulator 830) for executing compiled code previously compiled from the source code file to render an update of a view of a user interface (1120). In an example, the IDE 810 may send a message to the device simulator 830 with the new literal value and the lookup key, and the message with the new literal value and the lookup key gets passed to the preview agent 850, which then executes the previously compiled code and uses the lookup key to find the updated value in the incremental values table. In an example, the executed compiled code (e.g., when executed by the preview agent 850) then references the updated value of the particular string from the table, and as a result, the IDE 810 avoids recompiling the edited source code.

Figure 12:
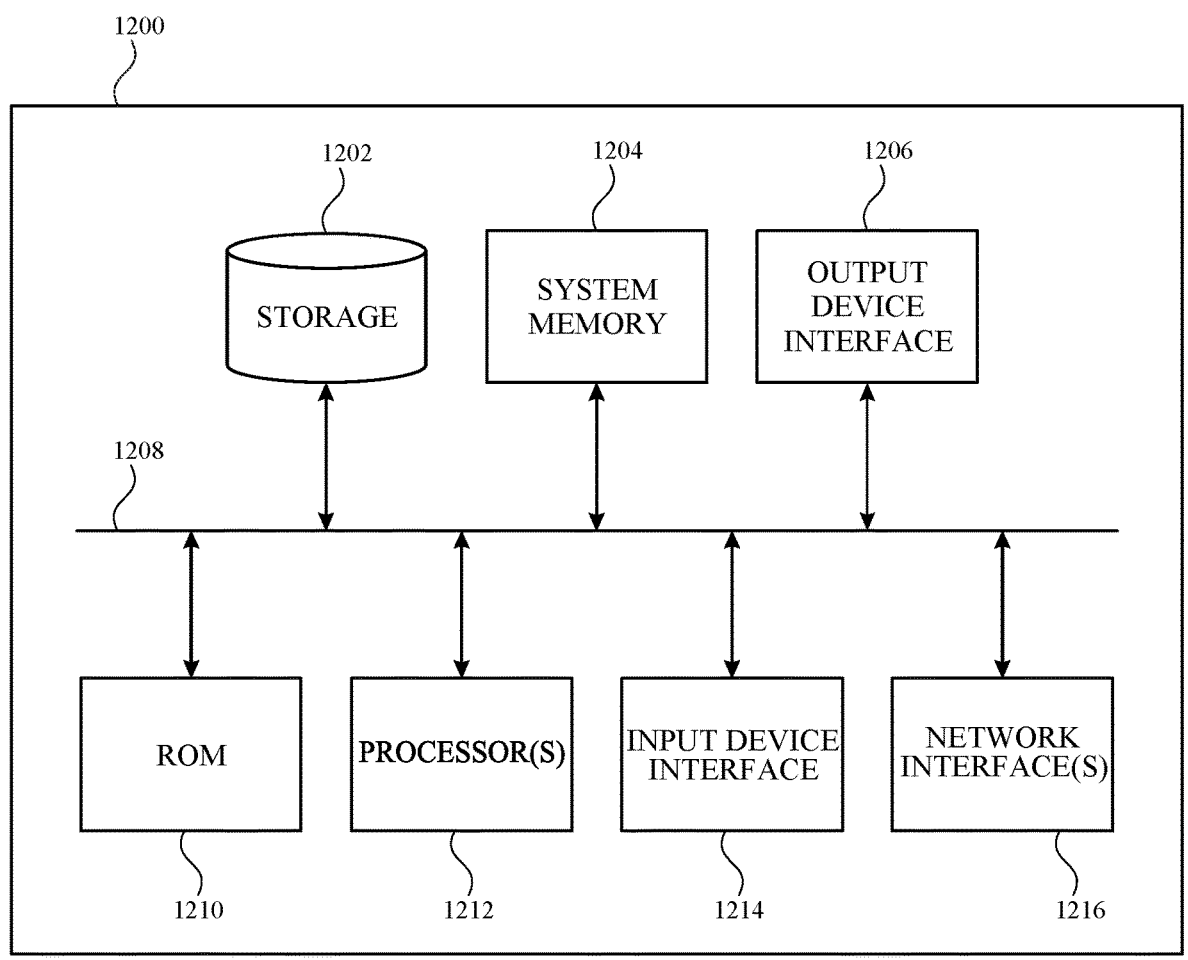
FIG. 12 illustrates an electronic system with which one or more implementations of the subject technology may be implemented.

FIG. 12 illustrates an electronic system 1200 with which one or more implementations of the subject technology may be implemented. The electronic system 1200 can be, and/or can be a part of, the electronic device 110, and/or the server 120 shown in FIG. 1. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 1206 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as the electronic device 110 shown in FIG. 1, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method implemented with a processor having thereon memory-stored executable instructions which, when executed by the processor, cause the processor to carry out actions of a development environment for user interface code editing, comprising:
   receiving code associated with a user interface (UI) element, wherein the code is included a project in an integrated development environment (IDE);
   determining a set of dynamically generated editors for modifying a representation of the UI element based on the code associated with the UI element, wherein determining the set of dynamically generated editors is further based at least in part on contextual information related to the UI element, and querying for a set of actions associated with the UI element; and
   displaying a tool for graphically modifying the representation of the UI element, the tool including a set of graphical elements corresponding to the determined set of dynamically generated editors, wherein the graphically modifying transforms the code associated with the representation of the UI element.

2. The method of claim 1, wherein querying for the set of actions comprises at least performing a first query for particular editors for the UI element, performing a second query for editors provided by a third party software development kit, and performing a third query for additional editors from the particular editors for the UI element.

3. The method of claim 1, wherein the set of dynamically generated editors comprise at least one of an editor for alignment, an editor for an inset, or an editor for sizing.

4. The method of claim 1, wherein the set of dynamically generated editors comprise at least one of an editor for color, or an editor for a style of text.

5. The method of claim 1, wherein the set of dynamically generated editors comprise an editor for inserting a new UI element, and the new UI element comprises at least one of an image, a spacer, a switch, or a view.

6. The method of claim 1, wherein determining the set of dynamically generated editors is based at least in part on respective indications of priority of each editor from the set of dynamically generated editors.

7. The method of claim 1, wherein determining the set of dynamically generated editors is based at least in part on a predetermined number of editors for including in the set of graphical elements of the tool.

8. The method of claim 1, wherein determining the set of dynamically generated editors is based at least in part on a portion of the UI element, the portion comprising at least one of a right edge and a left edge.

9. The method of claim 1, further comprising:
searching for a particular editor based on user input, wherein the user input comprises one or more characters that are received; and
providing one or more suggestions of editors based on the user input.

10. The method of claim 1, wherein the contextual information, for determining the set of dynamically generated editors, comprises a type of the UI element corresponding to the code.

11. A device comprising:
a memory; and
at least one processor configured to:
receive code associated with a user interface (UI) element, wherein the code is included a project in an integrated development environment (IDE);
determine a set of dynamically generated editors for modifying a representation of the UI element based on the code associated with the UI element, wherein determining the set of dynamically generated editors is further based at least in part on contextual information related to the UI element, and querying for a set of actions associated with the UI element; and
display a tool for graphically modifying the representation of the UI element, the tool including a set of graphical elements corresponding to the determined set of dynamically generated editors, wherein the graphically modifying transforms the code associated with the representation of the UI element.

12. The device of claim 11, wherein the set of dynamically generated editors comprise at least one of an editor for alignment, an editor for an inset, or an editor for sizing.

13. The device of claim 11, wherein the set of dynamically generated editors comprise at least one of an editor for color, or an editor for a style of text.

14. The device of claim 11, wherein the set of dynamically generated editors comprise an editor for inserting a new UI element, and the new UI element comprises at least one of an image, a spacer, a switch, or a view.

15. The device of claim 11, wherein the at least one processor is further configured to:
search for a particular editor based on user input, wherein the user input comprises one or more characters that are received; and
provide one or more suggestions of editors based on the user input.

16. The device of claim 11, wherein the contextual information, for determining the set of dynamically generated editors, comprises a type of the UI element corresponding to the code.

17. A non-transitory machine-readable medium comprising code that, when executed by one or more processors, causes the one or more processors to perform operations comprising:
receiving code associated with a user interface (UI) element, wherein the code is included a project in an integrated development environment (IDE);
determining a set of dynamically generated editors for modifying a representation of the UI element based on the code associated with the UI element, wherein determining the set of dynamically generated editors is further based at least in part on contextual information related to the UI element, and querying for a set of actions associated with the UI element; and
displaying a tool for graphically modifying the representation of the UI element, the tool including a set of graphical elements corresponding to the determined set of dynamically generated editors, wherein the graphically modifying transforms the code associated with the representation of the UI element.

18. The non-transitory machine-readable medium of claim 17, wherein the set of dynamically generated editors comprise at least one of an editor for alignment, an editor for an inset, or an editor for sizing.

19. The non-transitory machine-readable medium of claim 17, wherein the operations further comprise:
searching for a particular editor based on user input, wherein the user input comprises one or more characters that are received; and
providing one or more suggestions of editors based on the user input.

20. The non-transitory machine-readable medium of claim 17, wherein the contextual information, for determining the set of dynamically generated editors, comprises a type of the UI element corresponding to the code.

* * * * *